US007749066B2

(12) United States Patent
Hartman et al.

(10) Patent No.: US 7,749,066 B2
(45) Date of Patent: Jul. 6, 2010

(54) ENHANCED PROCESS FOR GAMING USING MULTIPLE RANDOM PROGRESSIVE PRIZE OPPORTUNITIES AND BINGO-TYPE OF GAMING PRODUCTS THEREBY

(75) Inventors: Michael Hartman, Reno, NV (US); Calvin Nicholson, Reno, NV (US); Joseph Kisenwether, Reno, NV (US)

(73) Assignee: Gametech International, Inc., Reno, NV (US)

( * ) Notice: Subject to any disclaimer, the term of this patent is extended or adjusted under 35 U.S.C. 154(b) by 736 days.

(21) Appl. No.: 11/050,114

(22) Filed: Feb. 2, 2005

(65) Prior Publication Data

US 2005/0192088 A1 Sep. 1, 2005

Related U.S. Application Data

(60) Provisional application No. 60/540,589, filed on Feb. 2, 2004.

(51) Int. Cl.
*A63F 9/24* (2006.01)
*G06F 19/00* (2006.01)
*A63F 1/18* (2006.01)

(52) U.S. Cl. ............................ 463/19; 463/25; 463/27; 273/269; 273/296

(58) Field of Classification Search ............ 463/17–22, 463/24–29, 33, 42–43, 16; 273/138.1, 138.2, 273/139, 141 A, 269, 296, 454–456, 460–461, 273/142 B, 142 C, 142 J; *G06F 19/00; A63F 9/00, A63F 9/24, 1/18*
See application file for complete search history.

(56) References Cited

U.S. PATENT DOCUMENTS 5,007,649 A * 4/1991 Richardson .................. 463/25
5,275,400 A * 1/1994 Weingardt et al. ............ 463/12
5,707,285 A * 1/1998 Place et al. .................... 463/12
5,718,631 A * 2/1998 Invencion ..................... 463/19
5,727,786 A * 3/1998 Weingardt .................. 273/269
6,099,407 A * 8/2000 Parker et al. .................. 463/19
6,117,009 A * 9/2000 Yoseloff ....................... 463/20
6,280,325 B1 * 8/2001 Fisk ............................ 463/19
6,398,645 B1 * 6/2002 Yoseloff ....................... 463/19
6,565,091 B2 * 5/2003 Weingardt .................. 273/269
6,569,017 B2 * 5/2003 Enzminger et al. ............ 463/19
6,581,935 B1 * 6/2003 Odom ........................ 273/269
6,722,655 B1 * 4/2004 Camero ...................... 273/269

(Continued)

*Primary Examiner*—Peter DungBa Vo
*Assistant Examiner*—Arthur O. Hall
(74) *Attorney, Agent, or Firm*—Dillon & Yudell LLP

(57) ABSTRACT

Novel enhanced gaming systems employ unique, specialized, for example, FIRESTAR ™ type of indicia disposed upon at least one location of a plurality of pre-mapped locations housed on, for example, a multiplicity of bingo-type of cards. Percentages of indicia arrayed on, for example, card sets are controlled by a gaming proprietor's or operator's configuration settings as are the respective locations of the subject indicia, for example, by using a random number generator to induce players to participate in multiple opportunities to garner prizes, for example, for achieving a bingo-type of victory concomittant with pre-established winning requirements and a pre-selected occurrence of a unique specialized indicum. Progressive reports serve to keep players, proprietors/operators and gaming authorities apprised of earnings both in terms of amounts, odds and related data on occurrence of the same indicia in real time providing unique inducement and tracking value in both hard copy and electronic form.

3 Claims, 7 Drawing Sheets

U.S. PATENT DOCUMENTS

| | | | | |
|---|---|---|---|---|
| 6,755,738 | B2 * | 6/2004 | Glasson et al. | 463/19 |
| 6,840,858 | B2 * | 1/2005 | Adams | 463/19 |
| 7,004,834 | B2 * | 2/2006 | Walker et al. | 463/16 |
| 7,029,395 | B1 * | 4/2006 | Baerlocher | 463/20 |
| 7,341,513 | B2 * | 3/2008 | Cuddy et al. | 463/20 |
| 7,347,777 | B2 * | 3/2008 | Gauselmann | 463/25 |
| 7,566,272 | B2 * | 7/2009 | Gerrard et al. | 463/25 |
| 7,614,948 | B2 * | 11/2009 | Saffari et al. | 463/19 |
| 2001/0034262 | A1 * | 10/2001 | Banyai | 463/17 |
| 2002/0094859 | A1 * | 7/2002 | Hirsch et al. | 463/19 |
| 2002/0094860 | A1 * | 7/2002 | Itkis et al. | 463/19 |
| 2002/0113369 | A1 * | 8/2002 | Weingardt | 273/269 |
| 2002/0117803 | A1 * | 8/2002 | Weingardt | 273/269 |
| 2002/0165018 | A1 * | 11/2002 | Duhamel | 463/12 |
| 2003/0104865 | A1 * | 6/2003 | Itkis et al. | 463/39 |
| 2003/0119581 | A1 * | 6/2003 | Cannon et al. | 463/25 |
| 2003/0144050 | A1 * | 7/2003 | Keaton et al. | 463/19 |
| 2003/0171986 | A1 * | 9/2003 | Itkis et al. | 705/14 |
| 2004/0048647 | A1 * | 3/2004 | Lind et al. | 463/19 |
| 2004/0077399 | A1 * | 4/2004 | Marshall | 463/19 |
| 2004/0178579 | A1 * | 9/2004 | Lowell et al. | 273/269 |
| 2004/0204243 | A1 * | 10/2004 | de Mello Costa | 463/42 |
| 2004/0251628 | A1 * | 12/2004 | Kilby | 273/269 |
| 2005/0043079 | A1 * | 2/2005 | Huang | 463/19 |

* cited by examiner

GameTech Bingo

Progressive Report
Software Version 6.10.3
GameTech International
Wed Jan 7 13:52:03 2004
For 01/07/2004 - 01/07/2004

General Information
Current value of progressive prize:
$76.72
Base value of progressive prize:
$153.85
Percent to progressive prize:
%13.18

Current value of seed prize:
$76.72
Base value of seed prize:
$150.00
Percent to seed prize:
%3.82

Winners

Report for 1/7/2004

DI Game#: 1
VIP #: 87622619
VIP Name: Donna Brenner
Session #: 2
Card #: 51835
Prize: $165.71
Pd in Credit: $200.00
Pd in Cash: $29.00

*FIG. 7*

ENHANCED PROCESS FOR GAMING USING MULTIPLE RANDOM PROGRESSIVE PRIZE OPPORTUNITIES AND BINGO-TYPE OF GAMING PRODUCTS THEREBY

RELATED APPLICATION

This application claims priority to Provisional Application No. 60/540,589, filed Feb. 2, 2004, the contents of which are incorporated herein in their entirety.

FIELD OF THE DISCLOSURE

The present disclosure relates to electronic gaming. In particular, the present disclosure relates to games providing gambling opportunities including, but not limited, to bingo, keno, slot, pull-tab, card-based and related games.

BACKGROUND

The gaming arts inherently support needs both to attract and induce player interest on an ongoing basis. Likewise, gaming proprietors require the ability to control prize awarding structures and pre-selected modes for effectively communicating entertaining and attractive messages to players while tracking odds of success and generating records of the historical inputs of players and outputs of their systems that can be replicated and shared with gaming authorities. However, the long-standing need in terms of all games, including bingo-type of games, relates to how they work to keep people entertained and induce their ongoing participation.

The present inventors have discovered that progressive gaming structures can be implemented in existing and prospective formats whereby players are induced to play and continue and proprietors can track and display or record prize winnings including odds and credits earned, distributed and available. Unexpectedly, according to the instant disclosure, the progressive prize structure itself is as strong a draw for players as any known mechanism currently in use, and is simply executed and effective for use with existing and prospective gaming formats.

SUMMARY

Games have regularly been defined as contrivances or arrangements for testing skill and/or being entertained. Within the context of electronic gaming and gambling, schemes pursued and measures planned by a gaming proprietor need to further embrace the concept that operating rules allow one to "play the game"—or games, rewards and prizes based upon the promise that the gaming proprietor and system used function according to predetermined rules. Since acting straightforwardly based upon rules can be programmed into such systems, visibility of same to players and generation of subsequent records of fairness and rule—based dealings are further aspects of the present disclosure.

An important improvement in gaming demanded by the market is the intangible element of attraction to users, perhaps driven by a longstanding need to improve functional aspects that progressive prize games to date have yet to satisfy. Manifestations of the present disclosure, in the bingo-type of game context, for example, enable skilled gaming players to realize the mathematical improvements in odds and thus better grasp the improved chances to win in a user friendly and entertaining context.

BRIEF DESCRIPTION OF THE DRAWINGS

The above-mentioned features and objects of the present disclosure will become more apparent with reference to the following description taken in conjunction with the accompanying drawings wherein like reference numerals denote like elements and in which.

DETAILED DESCRIPTION

Figure 1:
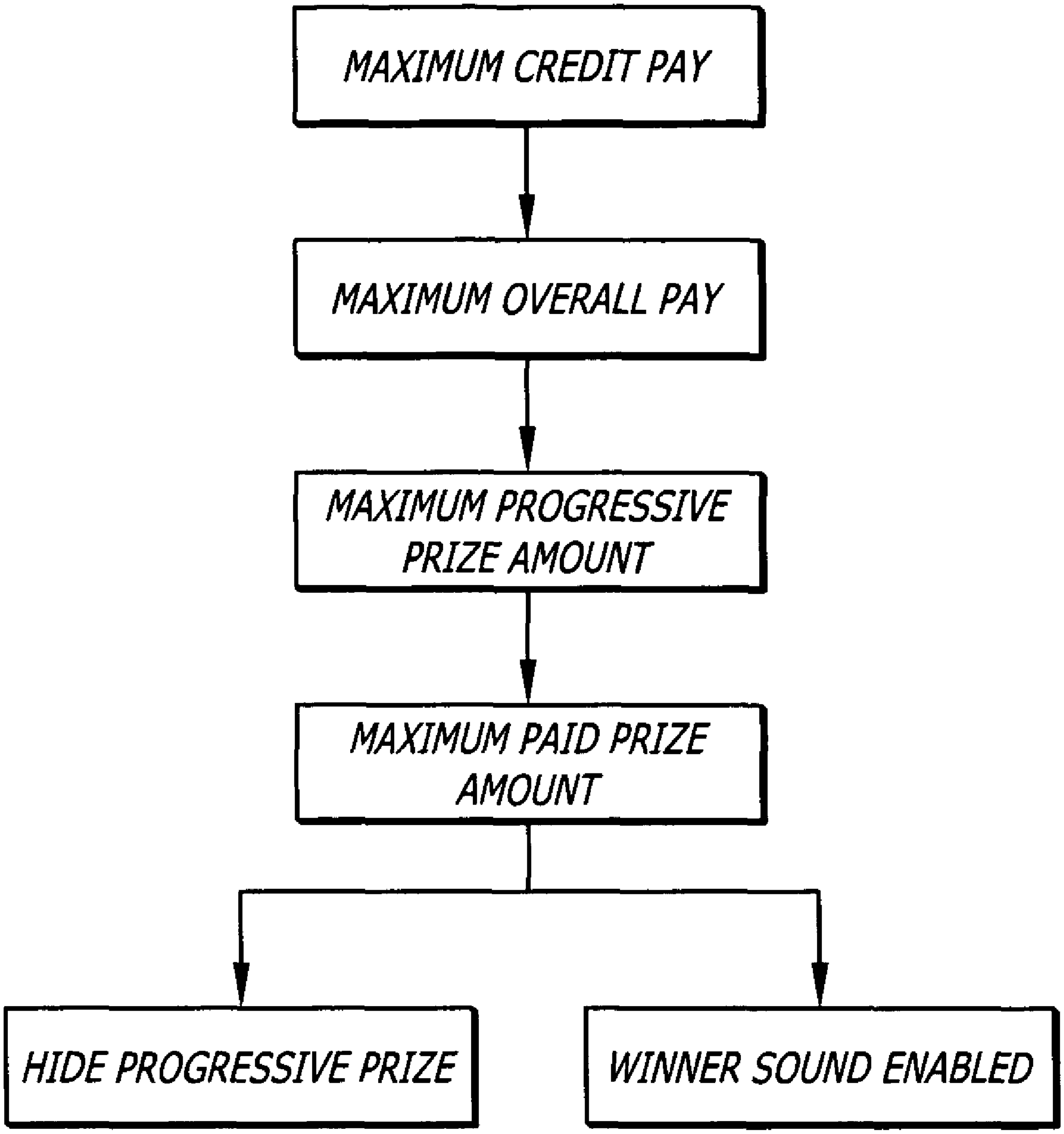
FIG. 1 is a flow chart schematically illustrating both optional and required configuration options according to the instant disclosure of the FIRESTAR™ brand of progressive game.

The present inventors have discovered that functionally speaking, progressive prize schemes are effective to induce ongoing participation in many types of electronic gaming systems, including for example, an illustrative example found in bingo-type of games. This application incorporates by reference U.S. Ser. Nos. 10/743,350, 60/435,274, 60/501,557 and 60/502,675 as if each was respectively set forth herein. Likewise, those skilled in the art will understand application of novel and utile aspect of the instant disclosure, including software, which leverage off of the strength of related gaming structures sold by GameTech™, however they relate to the same.

Those skilled in the gaming art will readily understand the interplay between the present disclosure, known and prospective systems, for example with the Universal Gaming Device type of gaming system and the Pay-N-Play™ type of system. (Available from GameTech™ International., Inc. of Reno, Nev.). The present disclosure works with portable, fixed, hand-held, internet based and other electronic gaming systems known to artisans.

The present inventors offer for consideration the proposition that commonality among certain types of gaming systems make them susceptible to certain novel enhanced progressive prize generation opportunities. The present disclosure is succinctly summarized within the context of a progressive bingo-type of game, for example, however artisans will readily understand the applicability to pull-tab and lottery types of games, among others sharing both the elements of chance and sliding scales of odds. Other games developed likewise can support the teachings of the present disclosure.

As set forth above, the teachings of the present disclosure are readily manifested and implemented within the context of a progressive bingo game, as set forth in this detailed description of the present disclosure in an illustrative fashion, and defined in the claims which are appended hereto.

The exemplary embodiment of a bingo-type of gaming system is in no way meant to be limiting of the present disclosure, rather to make the instant description technically accessible to those of normal skill in the art.

According to an illustrative bingo-type based game embodiment the present disclosure a player is offered an opportunity to win a progressive jackpot/prize upon concurrent receipt of the occurrence of a complete pattern of numbers whereby the last numbered space garnered has a unique, specialized indicum dispersed thereupon in a predetermined space. This pattern includes, but certainty is not limited to straight lines, diagonal lines and those patterns and combinations pre-selected to constitute a win.

Those having a medium of skill is the art understood the term "bingo" designate both the sudden occurrence of an event of completion of an action and a game of chance in which each contestant or player sports at least one card printed or marked with differently numbered squares or spaces on to which to place markers upon the drawing and announcement of numbers by a caller. The making of any predesignated complete pattern of numbers is coextensive with a victory—known itself as a "BINGO". See, for example, THE AMERICAN HERITAGE DICTIONARY OF THE ENGLISH LANGUAGE, $3^{RD}$ EDITION, Haughton, Mifflin Company, 1992 at Page 188. In manifesting aspects of the present disclosure electronically or through related means enabling the functionality of instant disclosure, artisans readily understand how simulacrums of cards, rows and spaces function. Likewise, association of, for example, the FIRESTAR™ type of, or brand of symbol, will become clear based upon the disclosure and scope of the subject matters visited within the claims as set forth below. For the purposes of this specification, the proprietary FIRESTAR™ brand of logo is used both in exemplary and specific terms, in that it is a trademark of GameTech™ International Inc. and also used for illustrative purposes, in the broader sense as a subject indicum herein denoted as a progressive prize winning symbol.

According to an embodiment of the present disclosure, there is provided in a gaming system having progressive prize opportunities, the improvement comprising a plurality of player selectable options, for allowing a player to have at least one option selected from the group of choices consisting of, electing to participate in progressive prize opportunities, and earning the ability to participate in progressive opportunities, whereby once a progressive win occurs a progressive prize report is generated providing real time information to the player as to the progressive contribution in the example of the instant electronic manifestation, those who are successful at achieving a FIRESTAR™ type of symbol mediated bingo event alternatively can be rewarded by means of credit, cash or alternative payment schemes—including combinations and credit—like awards. This is shown by a report available in real-time to players, FIG. 7, but the underlying progressive nature of the prize structure, also shown, is what induces ongoing participation.

Likewise, the gaming system proprietor/gaming hall operator has ongoing access to the frequency of occurrence of the, for example, FIRESTAR™ type of symbol on the electronic manifestations of the gaming cards in addition to a mathematical expression manifesting the frequency with which such a FIRESTAR™ type of indicum occurs in association with a number or location. An additional benefit of the instant teachings is realized whereby, for example, a gaming regulatory authority may be presented with a report detailing the frequency of occurrence of the, for example, FIRESTAR™ type of symbol on particular electric gaming card, or the frequency with which a FIRESTAR™ type of symbol is associated with a number, as often required for compliance.

In exemplary fashion, referring still to a bingo-type of electronic gaming device, the FIRESTAR™ type of symbol and/or FIRESTAR™ associated number can be made to appear on every first card, every second card, every third card or at whatever desired interval is intended. This enables at least one of the gaming hall operator, gaming hall proprietor, regulatory agency functionary/manufacturer or the like predesignated quality controller to require that a player purchase a predetermined amount of cards, play a predetermined number of prior or previous games and/or undertake other actions or analogous functions as criteria for eligibility for the FIRESTAR™ type of prize—thereby inducing an ongoing stream of participation according to the disclosure of the instant teachings.

Basically stated, under the FIRESTAR™ brand are housed progressive gaming applications including the exemplary bingo—type of games outlined above and discussed below, and claimed below, which function conjunctively with the Diamond™ brand of system and the Pay-N-Play™ type of system, available from GameTech™ International, Inc. The FIRESTAR™ brand of progressive bingo offers the player a chance to win a progressive jackpot if they bingo with the last number being called being determined to be in fixed proximate relation to, for example—on, upon, or under the FIRESTAR™ type of symbol.

The winners, according to this exemplary illustration of the process for gaming using multiple progressive opportunities can be given credit as a first possible mechanism for satisfaction of payments cashed through the Pay-N-Play™ brand of system, likewise cash may be dispensed or some combination of these means used.

Another important feature of the process is the existence of an option to determine the frequency, or relative frequency, of occurrences of the FIRESTAR™ brand of symbol denoted number on the cards, by way of example, the occurrence of the FIRESTAR™ branded number can be configured to be on every electronic card, every second electronic card, every third, fourth or fifth electronic card. Further contemplated under the process of the instant disclosure is an option of requiring players to purchase a predetermined minimum set amount of cards, engage in a predetermined minimum set amount of rounds of play, or the like means or mechanism to induce participation, continuous play, and an ongoing inducement in value accumulation.

To play with the FIRESTAR™ brand of system, players make credit purchases for play on the basic GAMETECH™ fixed-base or portable unit, by entering a pack number into their desired unit (See U.S. Ser. Nos. 10/743,350, 60/435,274, 60/501,557, 60/502,675 expressly incorporated by number herein).

According to a process of the present disclosure the following information is used to configure operation of the FIRESTAR™ type of progressive bingo. According to this example, the Bingo Manager indicates what the optional choice of maximum payout amount to be credited is (Optional Maximum Credit Pay). If the progressive prize amount is greater than the Maximum Credit Pay, the remainder of the payout is eligible to be made in cash. For example, if the FIRESTAR™ type of progressive payout is \$500.00 and the maximum credit amount is \$300.00 the customer is credited $300.00 and the remaining balance of $200.00 paid in cash. This may be shown for example, by having a prompt appear on the customer screen instructing the customer to seek the attendant.

The option of Maximum Overall pay means the sum total of that which is allowed to be paid out on a FIRESTAR™ type of progressive win—including both credit and cash amounts. Likewise the Optional Maximum Progressive Amount need to be configured to denote the maximum value of a FIRESTAR™ type of progressive prize. Similarly, Optional Maximum Goal Prize Amount needs to be configured to match the maximum value that the seed money will build to create money for this purpose means the amount that is used to rebuild the progressive prize once it has been won.

Optional choices for the FIRESTAR™ brand of progressive Bingo games finish the configuration options set forth in FIG. 1.

The Bingo Manager allows the progressive amount to be displayed on the player screen. Likewise, the sound may be either enabled or disabled for the FIRESTAR™ brand of progressive games' sound function on the player unit for a progressive winner.

It is also necessary to set parameters relating to the applicable games (it can apply to one or all games in the session); the card minimum (how many cards the customer must purchase to participate in the FIRESTAR™ type of progressive bingo); previous required games (which requires the customer to have participated in a designated number of games prior to purchase of the subject game.

For example, if this setting is configured as two previous games and the number is ten, the player would have had to participate in games eight and nine to be eligible for game ten (configured by individual game). The frequency, or progressive step amount designates the frequency of occurrence of the FIRESTAR™ branded symbol (205 in FIG. 2). For example, the occurrence of the FIRESTAR™ branded number can be configured to be on every card, every second card, every third card. The progressive minimum prize may also be set as an option, connoting the minimum prize for progressive games in addition to the Maximum Progressive Add, the percentage to be held by the hall (as profit from sales of a Pay-N-Play™ type game); the Pay-N-Play ™ Prize % (the percentage that will be designated to the game winner when FIRESTAR™ type of progressive prize is not won); the FIRESTAR™ Progressive Prize Percentage Funding (the percentage that will be designated to fund the progressive prize from the card sales); and the FIRESTAR™ Progressive Seed Prize Percentage Funding (which defines the percentage designated to rebuild the seed).

Figure 2:
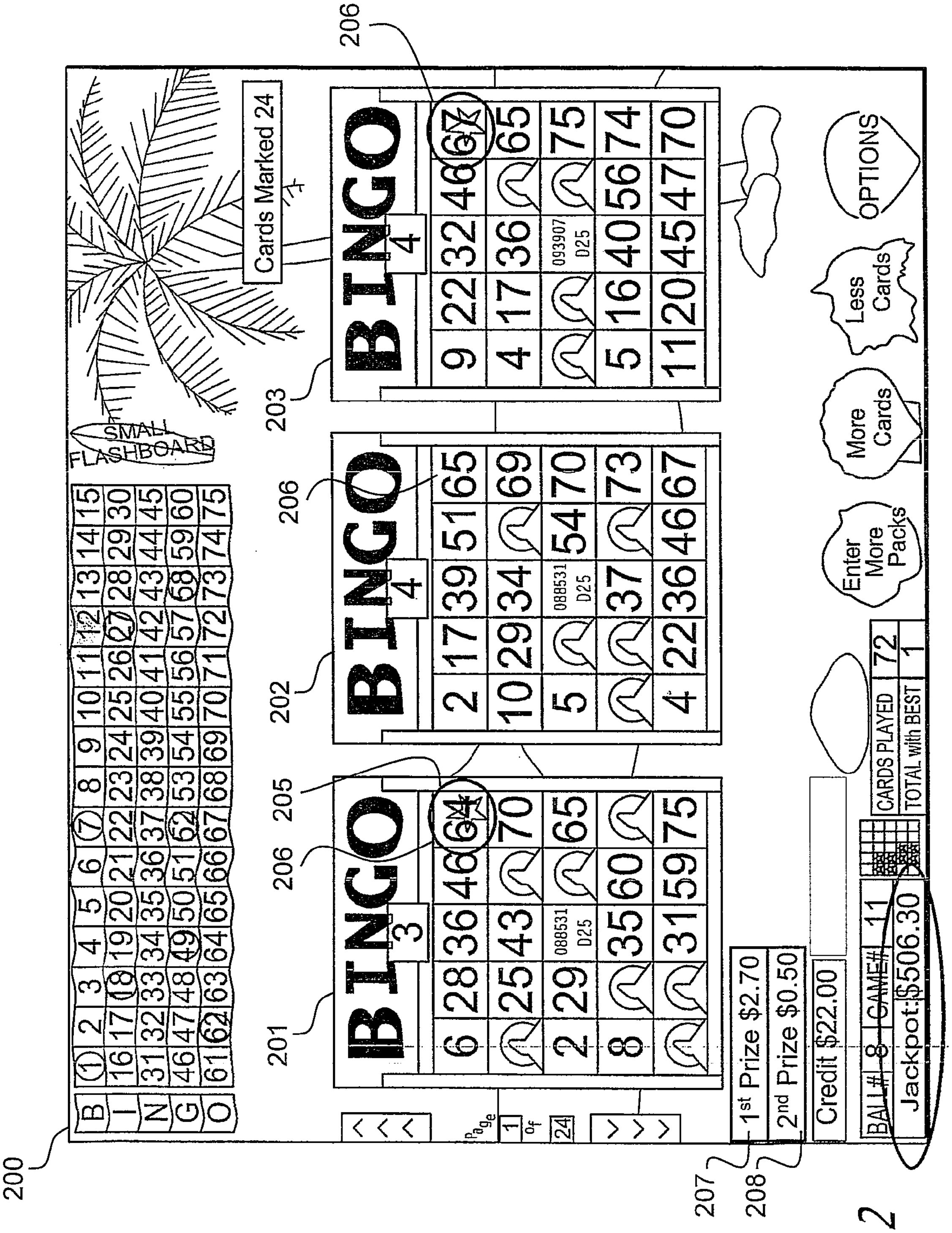
FIG. 2 is an exemplary view of a FIRESTAR™ brand of bingo-type of progressive game player screen, according to the instant disclosure.

Turning now to FIG. 2, in general terms the basic player screen 200 shows electronic bingo-type of cards 201, 202, 203 as discussed above.

Figure 3:
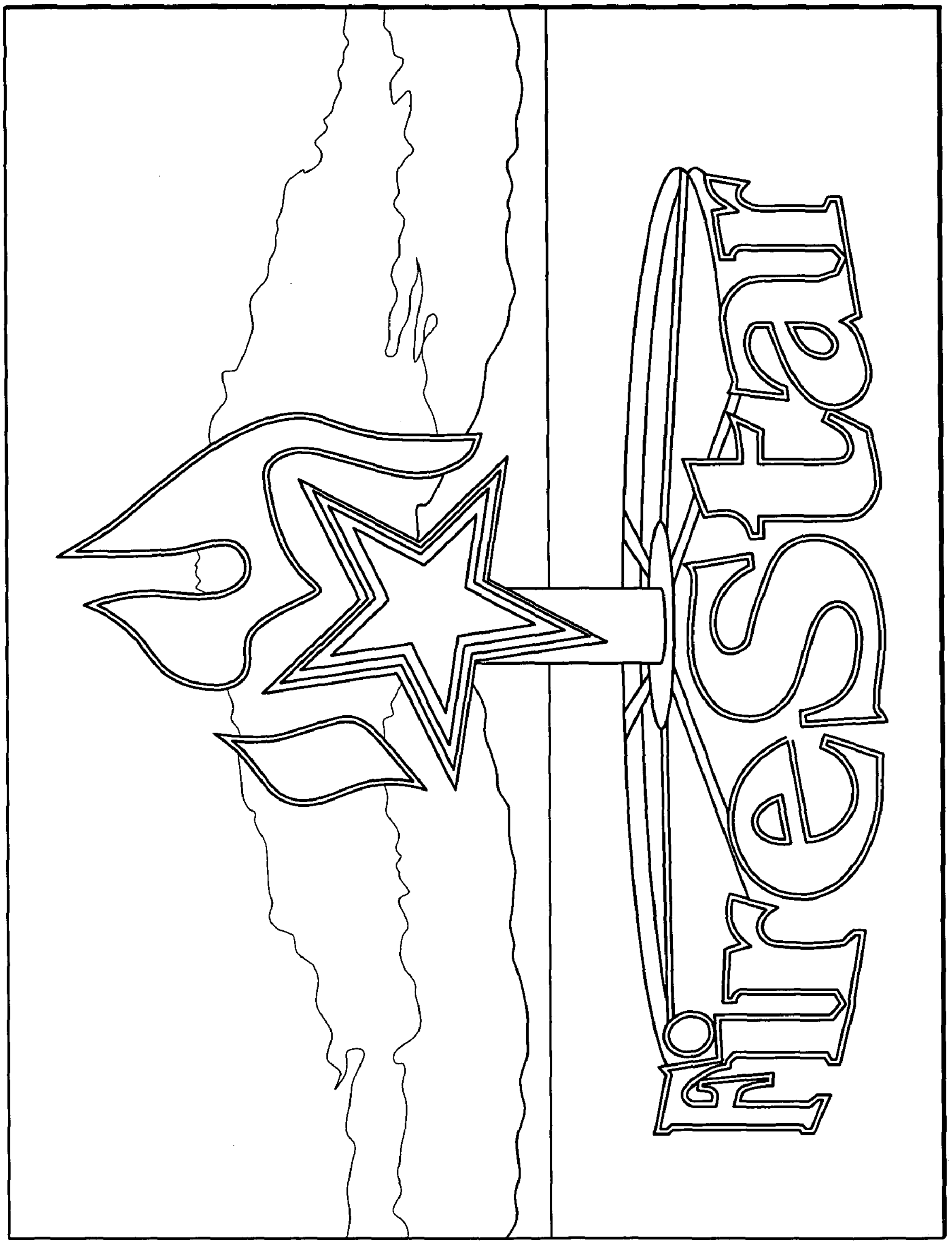
FIG. 3 is a graphic illustration of the FIRESTAR™ brand of indicum, as displayed in the context of a progressive game winner screen according to the instant disclosure.
Figure 4:
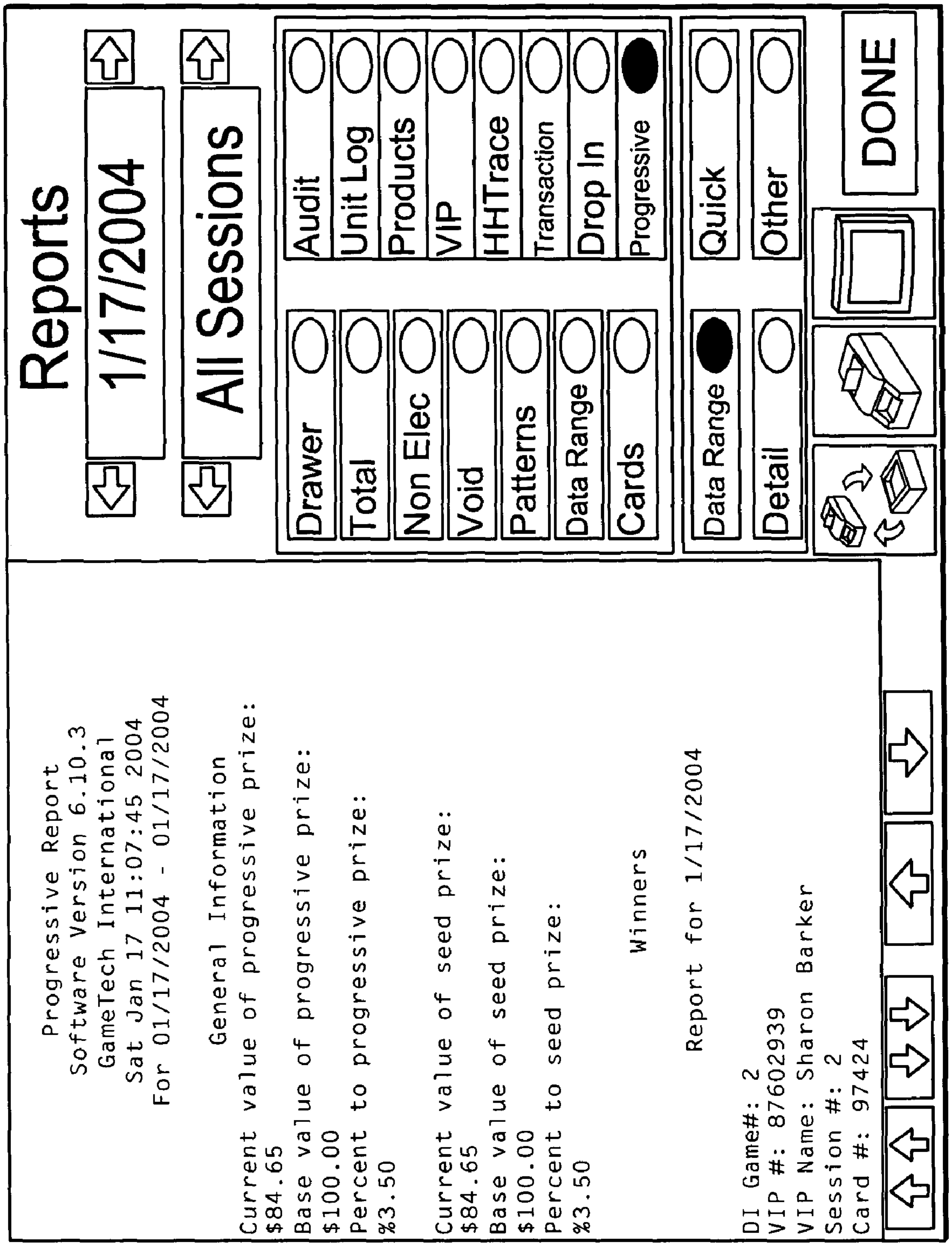
FIG. 4 is a report screen according to the instant disclosure showing how progressive prizes are valued and displayed.

FIG. 3 shows the view which a player has when designated a progressive winner (player screen). This correlates with the view shown in FIG. 4, which is of a caller screen with progressive prize displayed. Referring still to FIG. 4, it is noted that a main caller screen displays the current progressive prize amount.

Figure 5:
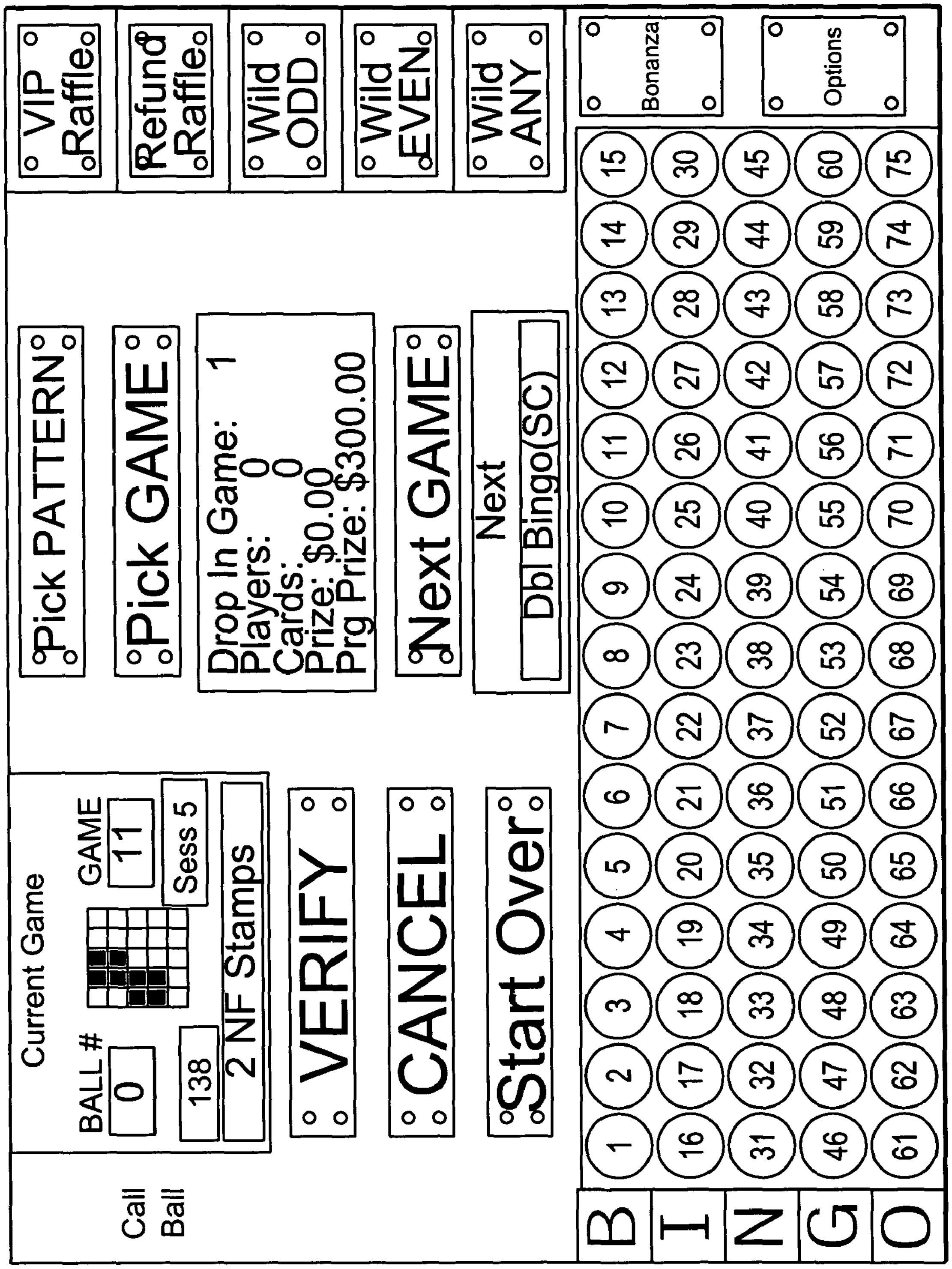
FIG. 5 is a gaming screen showing ways to induce anyone participating in a FIRESTAR™ brand of bingo-type of progressive game according to the instant disclosure.
Figure 6:
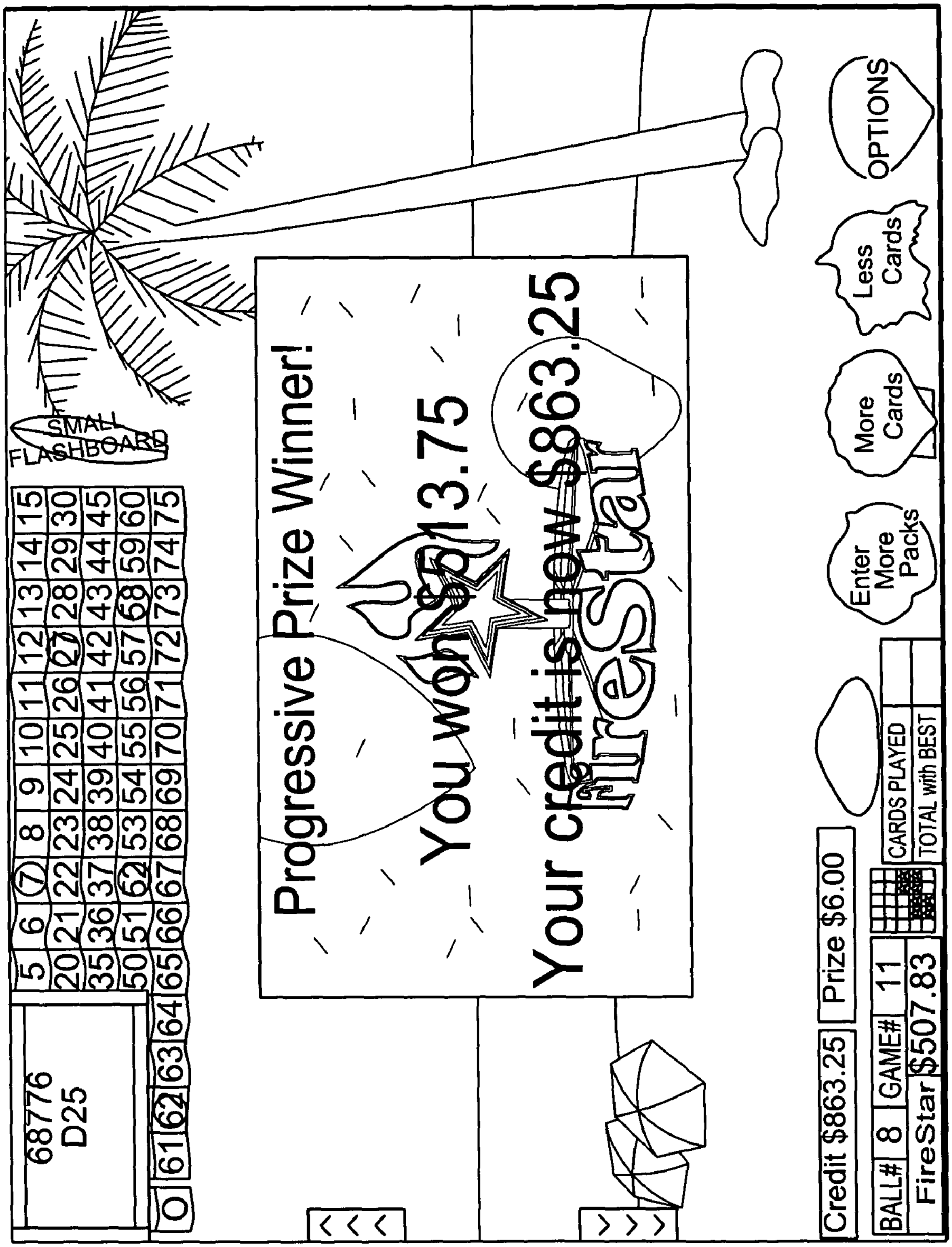
FIG. 6 is another exemplary screen with a Progressive Prize shown for a FIRESTAR™ brand of bingo-type of progressive game according to the instant disclosure; and, FIG. 7 is a report of the GameTech™ FIRESTAR™ brand of Bingo Progressive Report generated according to the instant disclosure.

FIG. 5 through FIG. 7 show the screens which embody the bingo-type of game according to the present disclosure, with cards and numbers that function according to conventional; bingo-type of rules and conventions.

FIG. 7 shows a report, generated with three sections one for progressive prizes, one for seed value and one for winners. Artisans will readily understand how this make the functioning and reward system of the instant disclosure accessible and visible.

If the caller accesses the pick game option from the main screen, the term FIRESTAR™ will appear on all games designated as FIRESTAR™ branded progressive games. Otherwise, the terms and conditions of conventional bingo, for example, apply during play, when the caller advances to a new game the player is prompted to purchase cards as per the general operations of the Pay-N-Play system. If the game is a FIRESTAR™ branded progressive game, the players' screen changes to reflect the FIRESTAR™ symbol 205, and optionally the progressive prize amount.

Depending on the frequency configured, the FIRESTAR™ symbol 205 will be randomly placed on the player cards. As configured in accordance with FIG. 1, the minimum number of cards and the previous games played may required for the FIRESTAR™ brand of game to be available.

EXAMPLE

Pay-N-Play Multiple-Progressive Game

Those skilled in the art will readily understand that this game can be played with any-on selected by a bingo manager. By way of example, only, in Game Play players buy cards and play 4, 6 or 8 on (common value would be 3, 6, or 9) for one dollar or multiple 6 on's can be purchased. The cards 201, 202, 203 appear on the players screen 200 per 6 on. Player then selects on location 206 on one of the cards 201, 202, 203. This location applies to all cards but not all prizes. The individual card 201 that the location was selected on will now have a gold border. The other cards 202, 203 will appear with a blue border. This will apply for all 6-ons purchased For Blue Prizes 208, the customer bingos with the last number (e.g., O-64) called being on the location 206 that they selected but not the card 201 that they selected. The odds on Blue Prizes 208 for a letter X pattern on a 6-on the odds would be (5 in 48) or 1 in 9.6 games that this prize would hit. The odds are not effected by the number of cards played but the greater the number of cards played the greater the chance to have multiple bingos and therefore split prizes. Depending on the player spend and the number of people playing this game it would hit about 4 times an hour and the prize amount would be anywhere from an estimated $2.00 to $20.00. This would be like the low level prize in that trickles a small amount of money back to the players to keep their interest up (like a slot machine).

For Gold Prize 207 the customer bingos with the last number (e.g., O-64) called being the card 201 (gold card) that they made their original selection on. If they do not select one the system will randomly select one for them. The player will have one gold card per 6-on. This progressive would hit about once an hour. The odds on Gold Prize 207 would be 1 in 8 games that this prize would hit on a single card. The odds are controlled by making the player select one location on one card on a (3-on or 6)-on. This would force the halls to sell cards as 6-ons or whatever is selected. The odds are also controlled by selecting which patterns the halls are allowed to play.

For Line Prize the third prize will be a typical line game. The game and prize amount can be varied. The odds which apply only to a line hit in 5 or fewer calls, for example, would be 1 in 59,107.

For the Mystery Money Prize the customer must have a line bingo and the last ball called must fall on this bingo. The bingo will have to be on a gold card. The odds can be changed depending on a line in 5 or a line in 6, etc. There are various decisions for the player to make. The first being which card on the 6-on should be gold and the second being the location on the card. Some locations will have better odds of hitting prize 4 than others. If a player does not select a location that is in the pattern then they have no chance of hitting either Prize 1 or Prize 2.

EXAMPLE

FIRESTAR™ Brand of Progressive Bingo Game

An enhanced electronic bingo game comprising a communications module for transferring information relating to a plurality of card, number and related strings of data between a player to a system, a display 200 for providing a menu to select different game options; an authentication module, an input module, and, a control module for setting progressive prize winning opportunities embodies an example of the instant disclosure further comprising a plurality of specialized indicia denoting prizes disposed in association with select numbers and spaces of a plurality of the involved bingo cards, wherein special prizes 207, 208 are awarded to a player who achieves a particular pattern with a last number (e.g., O-64) called corresponding to at least one of a number and a space marked by a specialized indicum 205, wherein multiple differing specialty prizes 207, 208 may be awarded depending on the pattern hit, the number of calls before the pattern was hit, and the specific card on which the pattern was hit, wherein the odds of the game can be adjusted by a bingo manager by changing the number of specialized indicia per group of cards, which adjusts the frequency with which the specialized indicia 205 appear on the cards 201 202, 203, and further comprising a function permitting a player to pay extra money to increase the frequency with which the cards in his game receive specialized indicia disposed thereon, thereby increasing the player's odds of garnering a special prize 207, 208.

In sum, the present inventors have realized that progressive gaming schemes are effective for both enhancing and enriching the gaming experience for players. A unique bingo-based version of the present disclosure, as illustratively visited above within the context of an electronic gaming system is currently known as the FIRESTAR™ brand of progressive bingo system (available from GameTech™ International, Inc. of Reno, Nev.) and enables players to enjoy specialized indicia 205 in select locations on some of the numbers and spaces of involved bingo cards, special prizes for players who achieve bingos on those spaces and ways to increase chances of winning.

While the above description contains many specifics, these should not be construed as limitations on the scope of the disclosure, but rather as an exemplification of preferred embodiments thereof. The disclosure includes any combination or subcombination of the elements from the different species and/or embodiments disclosed herein. One skilled in the art will recognize that these features, and thus the scope of the present disclosure should be interpreted in light of the following claims and any equivalents thereto.

What is claimed is:

1. A method of playing a special bingo game, the method comprising:

displaying, on a display, a plurality of bingo cards;

receiving, using a computer, a selection of a location on a first bingo card of the plurality of bingo cards;

displaying, on a display, a first unique, specialized indicum at the selected location on the first bingo card; and awarding, using the computer, a first special prize when, concurrently, a bingo resulting from a plurality of numbers called consecutively by an operator is completed on the first bingo card and the last number called of the plurality of numbers called to complete said bingo corresponds to the selected location on the first bingo card of the plurality of bingo cards.

2. The method of claim 1, the method further comprising awarding, using said computer, a second special prize when, concurrently, said bingo resulting from the plurality of numbers called consecutively by the operator is completed on one or more of the plurality of bingo cards excluding the first bingo card and the last number called of the plurality of numbers called to complete said bingo corresponds to a location on the second bingo card of the plurality of bingo cards that is, location-wise, the same location as the selected location on the first bingo card.

3. The method of claim 2, the method further comprising displaying, on said display, a second unique, specialized indicum at the location on the second bingo card that corresponds location-wise to the same location on the first bingo card that corresponds to the first indicum, wherein the second indicum is different from the first indicum.

* * * * *